(12) United States Patent
Li et al.

(10) Patent No.: US 9,723,477 B2
(45) Date of Patent: *Aug. 1, 2017

(54) MEASUREMENT BASED EUICC FALL-BACK

(71) Applicant: Telefonaktiebolaget LM Ericsson (publ), Stockholm (SE)

(72) Inventors: Qiang Li, Täby (SE); Justus Petersson, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/156,195

(22) Filed: May 16, 2016

(65) Prior Publication Data

US 2016/0262008 A1 Sep. 8, 2016

Related U.S. Application Data

(63) Continuation of application No. 14/263,527, filed as application No. PCT/SE2013/051419 on Nov. 29, 2013, now Pat. No. 9,351,151.

(51) Int. Cl.
*H04W 4/00* (2009.01)
*H04W 8/20* (2009.01)
(Continued)

(52) U.S. Cl.
CPC .............. *H04W 8/20* (2013.01); *H04W 8/183* (2013.01); *H04W 36/30* (2013.01); *H04W 48/08* (2013.01);
(Continued)

(58) Field of Classification Search
CPC ...................................................... H04W 8/183
(Continued)

(56) References Cited

U.S. PATENT DOCUMENTS 8,254,981 B2 8/2012 Dwyer et al.
8,644,178 B1 2/2014 Oroskar
(Continued)

OTHER PUBLICATIONS

European Commission, "Large Scale Integrating Project EXALTED Expanding LTE for Devices", Feb. 29, 2012, pp. 1-115, FP7 Contract No. 258512, Seventh Framework Programme, Deliverable 5.1.

(Continued)

*Primary Examiner* — Kiet Doan
(74) *Attorney, Agent, or Firm* — Coats & Bennett, PLLC

(57) ABSTRACT

The present disclosure relates to a method performed by a connectivity service platform in a communication network. The method comprises storing a fall-back policy comprising information about a fall-back timer. The method also comprises sending a policy message comprising information about the fall-back policy to a radio device comprising an eUICC. The method also comprises determining that the radio device experiences a problem with a wireless network connection from a first subscription of the radio device with a first network operator. The method also comprises starting the fall-back timer in accordance with the stored fall-back policy in response to said determining The method also comprises falling back in accordance with the stored fall-back policy in response to the started fall-back timer having expired, thereby enabling the connectivity service platform to communicate with the radio device via a network connection from a second subscription of the radio device instead of from the first subscription.

20 Claims, 4 Drawing Sheets

(51) Int. Cl.
*H04W 8/18* (2009.01)
*H04W 36/30* (2009.01)
*H04W 48/08* (2009.01)
*H04W 48/00* (2009.01)
*H04W 76/02* (2009.01)
*H04W 84/04* (2009.01)

(52) U.S. Cl.
CPC ......... *H04W 48/17* (2013.01); *H04W 76/027* (2013.01); *H04W 4/005* (2013.01); *H04W 84/042* (2013.01)

(58) Field of Classification Search
USPC ......... 455/435.2, 436, 410, 446, 561, 432.1, 455/558; 370/235, 230, 331
See application file for complete search history.

(56) References Cited

U.S. PATENT DOCUMENTS

| | | | |
|---|---|---|---|
| 8,825,044 | B2 | 9/2014 | Oroskar et al. |
| 2010/0062779 | A1* | 3/2010 | Bienas ................. H04W 24/04 455/446 |
| 2012/0329521 | A1 | 12/2012 | Jacobs et al. |
| 2013/0150032 | A1* | 6/2013 | Pattaswamy ...... H04W 52/0229 455/434 |
| 2014/0198640 | A1 | 7/2014 | Suzuki et al. |
| 2014/0370886 | A1 | 12/2014 | Lisak |

OTHER PUBLICATIONS

GSM Association, "Remote Provisioning Architecture for Embedded UICC", Jul. 1, 2013, pp. 1-82, Version 1.43, GSM Association.
European Telecommunications Standards Institute, "Smart Cards; Machine to Machine UICC; Physical and logical characteristics (Release 9)", Technical Specification, ETSI TS 102 671 V9.1.0, Sep. 1, 2011, pp. 1-21, ETSI.
European Telecommunications Standards Institute, "Smart Cards; Embedded UICC; Requirements Specification (Release 12)", Technical Specification, ETSI TS 103 383 v12.2.0 , Sep. 1, 2013, pp. 1-20, ETSI.
European Telecommunications Standards Institute, "Technical Committee Smart Card Platform (TC SCP) TC SCP REQ Meeting #38, Osaka, Japan, May 28-30, 2012 Report", ETSI TS SCP REQ Meeting #39, Freising, Germany, Sep. 24, 2012, pp. 1-24, Tdoc SCPREQ(12)000070r1, ETSI.
GSM Association, "Embedded SIM Task Force Requirements and Use Cases", Non-confidential White Paper, Feb. 21, 2011, pp. 1-38, GSM Association.

* cited by examiner

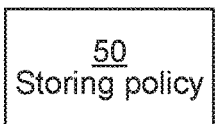
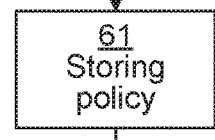
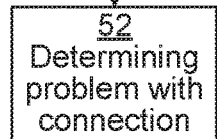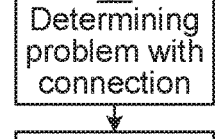
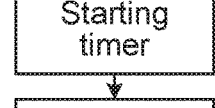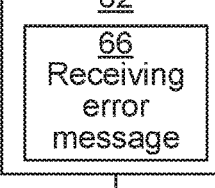
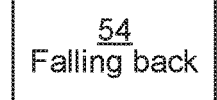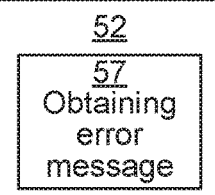
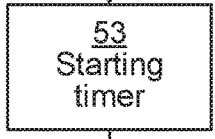
Fig. 5a
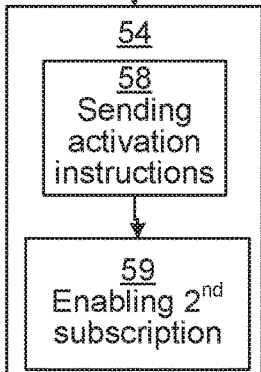
Fig. 5b
Fig. 6a
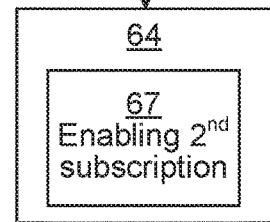
Fig. 6b and devices of a communication network for managing subscriptions for wireless connection of a radio device having an embedded Universal Integrated Circuit Card (eUICC).

MEASUREMENT BASED EUICC FALL-BACK

CROSS-REFERENCE TO RELATED APPLICATIONS

The present application is a continuation of U.S. application Ser. No. 14/236,527, which is the national stage entry under 35 U.S.C. 371 of international application no. PCT/SE2013/051419, filed Nov. 29, 2013, each of which applications are incorporated herein by reference in their entirety.

TECHNICAL FIELD

The present disclosure relates to methods and devices of a communication network for managing subscriptions for wireless connection of a radio device having an embedded Universal Integrated Circuit Card (eUICC).

BACKGROUND

Unlike a traditional UICC Subscriber Identity Module (SIM) card used in a consumer device, e.g. a mobile phone, all eUICC that are deployed in e.g. Machine-to-Machine (M2M) solutions and embedded into the M2M device cannot easily be accessed by human intervention to switch the SIM card manually during the device life cycle. According to the Global System for Mobile Communications (GSM) Association (GSMA) eUICC standard (GSMA "Remote Provisioning Architecture for Embedded UICC" DRAFT 1.39 29 Apr. 2013) and European Telecommunications Standards Institute (ETSI) eUICC Standard (EXALTED "Expanding LTE for Devices" FP7 Contract Number: 258512, Feb. 29, 2012), all eUICC shall be delivered with a pre-installed provisioning subscription for remote provisioning/bootstrapping purpose (i.e. a provisioning/bootstrapping operator provides initial bootstrapping connectivity for eUICC in order to enable late binding feature i.e. to remotely provision the 1st eUICC operational subscription to the eUICC when the device (e.g. a car) comprising the eUICC is shipped from initial manufacturer country to the destination country (1st operational subscription could be provided by the local operator from the destination country), and then later to change the eUICC active operational subscription from the current operator subscription to an new operator (due to the location being changed to another country, or changed operator subscription) during the device/eUICC long life cycle (15-20 years), in order to avoid high roaming fee and/or single operator lock-in situation during the device long life cycle e.g. in the automotive industry or for smart metering/security cameras etc.

However, eUICC connectivity may be lost permanently during subscription management lifecycle through operations such as enable/disable/activate/pause/deactivate/terminate/etc. In such cases the eUICC and network must fall back to an available subscription to recover the initial connectivity.

Chapter 3.5.12 "Fall-Back Mechanism" of GSMA "Remote Provisioning Architecture for Embedded UICC" DRAFT 1.39 29 Apr. 2013 states that in the event of loss of network connectivity, as detected by the device, there is a need to change to the profile with fall-back attribute set. In this case the eUICC disables the currently enabled Profile (Profile A) and enables the Profile with Fall-back Attribute set (Profile B). The device reports network loss to the eUICC. The eUICC is configured to perform the fall-back mechanism if certain network connectivity issues are reported by the Device.

SUMMARY

It has been realised that it may be difficult to fall back since the radio device has lost network connectivity and may not have an active secondary subscription to fall back to. It can thus not contact a wireless network of another operator to set up another subscription since it does not have network connectivity.

Subscriptions of radio devices, e.g. M2M devices, may be handled via a connectivity service platform, e.g. the Ericsson Device Connection Platform (DCP) or other hosted core network (CN) or home public land mobile network (Home PLMN or HPLMN) which may be used by several different network operators to manage subscriptions for radio devices having eUICC (since the subscriptions are not handled manually by inserting a UICC card in the device). Thus, a host may host a multi-tenant home location register (HLR) and other core network nodes (Gateway General Packet Radio Service (GPRS) support node (GGSN), short message service centre (SMSC), etc.) in HPLMN as a core network service for all customer operators. All the M2M subscribers of the operators are registered and stored on hosted HLR. Connectivity is provided as a service to all operators hosted on the platform. On top of the core network service, also a cloud business support system (BSS) may be hosted to provision and manage subscriber data, processes, billing, etc. In accordance with the present disclosure, eUICC features are added in the connectivity service platform to meet the new developments within this field (eUICC for M2M connections from vehicles (cars), smart metering, security camera, and also for consumer electronics).

According to an aspect of the present disclosure, there is provided a method performed by a connectivity service platform in a communication network. The method comprises storing a fall-back policy comprising information about a fall-back timer. The method also comprises sending a policy message comprising information about the fall-back policy including the fall-back timer to a radio device comprising an eUICC, said radio device having a wireless network connection. The method also comprises determining that the radio device experiences a problem with a wireless network connection from a first subscription of the radio device with a first network operator. The method also comprises starting the fall-back timer in accordance with the stored fall-back policy in response to said determining The method also comprises falling back in accordance with the stored fall-back policy in response to the started fall-back timer having expired, thereby enabling the connectivity service platform to communicate with the radio device via a network connection from a second subscription of the radio device instead of from the first subscription.

According to another aspect of the present disclosure, there is provided a computer program product comprising computer-executable components for causing a connectivity service platform to perform an embodiment of the method performed by a connectivity service platform, of the present disclosure, when the computer-executable components are run on processor circuitry comprised in the connectivity service platform.

According to another aspect of the present disclosure, there is provided a connectivity service platform for a communication network. The platform comprises processor circuitry, and storage storing instructions that, when executed by the processor circuitry, cause the connectivity service platform to store a fall-back policy comprising information about a fall-back timer. The instructions also cause the platform to send a policy message comprising information about the fall-back policy including the fall-back timer to a radio device comprising an eUICC, said radio device having a wireless network connection. The instructions also cause the platform to determine that the radio device experiences a problem with a wireless network connection from a first subscription of the radio device with a first network operator. The instructions also cause the platform to start the fall-back timer in accordance with the stored fall-back policy in response to said determining The instructions also cause the platform to fall back in accordance with the stored fall-back policy in response to the started fall-back timer having expired, enabling the connectivity service platform to communicate with the radio device via a network connection from a second subscription of the radio device instead of from the first subscription.

According to another aspect of the present disclosure, there is provided a computer program comprising computer program code which is able to, when run on processor circuitry of a connectivity service platform, cause the connectivity service platform to store a fall-back policy comprising information about a fall-back timer. The code is also able to cause the platform to send a policy message comprising information about the fall-back policy including the fall-back timer to a radio device comprising an eUICC, said radio device having a wireless network connection. The code is also able to cause the platform to determine that the radio device experiences a problem with a wireless network connection from a first subscription of the radio device with a first network operator. The code is also able to cause the platform to start the fall-back timer in accordance with the stored fall-back policy in response to said determining The code is also able to cause the platform to fall back in accordance with the stored fall-back policy in response to the started fall-back timer having expired, enabling the connectivity service platform to communicate with the radio device via a network connection from a second subscription of the radio device instead of from the first subscription.

According to another aspect of the present disclosure, there is provided a computer program product comprising an embodiment of the computer program for a connectivity service platform, of the present disclosure, and a computer readable means on which the computer program is stored.

According to another aspect of the present disclosure, there is provided a method performed by a radio device, comprising an eUICC, in a communication network. The method comprises receiving a policy message, comprising information about a platform fall-back policy including a platform fall-back timer, from a connectivity service platform via a wireless network connection. The method also comprises storing a device fall-back policy comprising information about a device fall-back timer based on said received policy message. The method also comprises determining that the radio device experiences a problem with a wireless network connection from a first subscription of the radio device with a first network operator. The method also comprises starting the device fall-back timer in accordance with the stored fall-back policy in response to said determining. The method also comprises falling back in accordance with the stored fall-back policy in response to the started fall-back timer having expired, thereby enabling the radio device to communicate with the connectivity service platform via a network connection from a second subscription of the radio device instead of from the first subscription.

According to another aspect of the present disclosure, there is provided a computer program product comprising computer-executable components for causing a radio device to perform an embodiment of the method performed by a radio device, of the present disclosure, when the computer-executable components are run on processor circuitry comprised in the radio device.

According to another aspect of the present disclosure, there is provided a radio device for a communication network. The radio device comprises an eUICC, processor circuitry, and storage storing instructions that, when executed by the processor circuitry, cause the radio device to receive a policy message, comprising information about a platform fall-back policy including a platform fall-back timer, from a connectivity service platform via a wireless network connection. The instructions also cause the radio device to receive a policy message, comprising information about a platform fall-back policy including a platform fall-back timer, from a connectivity service platform via a wireless network connection. The instructions also cause the radio device to store a device fall-back policy comprising information about a device fall-back timer based on said received policy message. The instructions also cause the radio device to determine that the radio device experiences a problem with a wireless network connection from a first subscription of the radio device with a first network operator. The instructions also cause the radio device to start the device fall-back timer in accordance with the stored fall-back policy in response to said determining The instructions also cause the radio device to fall back in accordance with the stored fall-back policy in response to the started fall-back timer having expired, thereby enabling the radio device to communicate with the connectivity service platform via a network connection from a second subscription of the radio device instead of from the first subscription.

According to another aspect of the present disclosure, there is provided a computer program comprising computer program code which is able to, when run on processor circuitry of a radio device comprising an eUICC in a communication network, cause the radio device to receive a policy message, comprising information about a platform fall-back policy including a platform fall-back timer, from a connectivity service platform via a wireless network connection. The code is also able to cause the radio device to store a device fall-back policy comprising information about a device fall-back timer based on said received policy message. The code is also able to cause the radio device to determine that the radio device experiences a problem with a wireless network connection from a first subscription of the radio device with a first network operator. The code is also able to cause the radio device to start the device fall-back timer in accordance with the stored fall-back policy in response to said determining The code is also able to cause the radio device to fall back in accordance with the stored fall-back policy in response to the started fall-back timer having expired, thereby enabling the radio device to communicate with the connectivity service platform via a network connection from a second subscription of the radio device instead of from the first subscription.

According to another aspect of the present disclosure, there is provided a computer program product comprising an embodiment of the computer program for the radio device, of the present disclosure, and a computer readable means on which the computer program is stored.

By having a fall-back policy, and by the connectivity service platform (below also called "the platform") informing the radio device about said policy, both the network side, as represented by the platform, and the radio device can fall back, each by itself since network connectivity is lost, taking into account knowledge of each other's fall-back policies. Both the platform and the radio device may e.g. fall back at the same time and in the same way (typically to the same network subscription) in a synchronised manner. Thus, the risk of the radio device falling back to one subscription, or keeping a non-functioning subscription, and the network (platform) falling back to another subscription (or keeping a non-functional subscription), which would result in a permanent loss of connectivity, can be eliminated. Typically, the fall-back policy of the platform corresponds to/is the same as the fall-back policy of the radio device. The fall-back is in response to a determination that the radio device experiences a problem with its network connection via the first subscription, typically by means on measurements performed on the network connection.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 5a is a schematic flow chart of an embodiment of a method of a connectivity service platform, of the present disclosure.

FIG. 5b is a schematic flow chart of another embodiment of a method of a connectivity service platform, of the present disclosure.

FIG. 6a is a schematic flow chart of an embodiment of a method of a radio device, of the present disclosure.

FIG. 6b is a schematic flow chart of another embodiment of a method of a radio device, of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
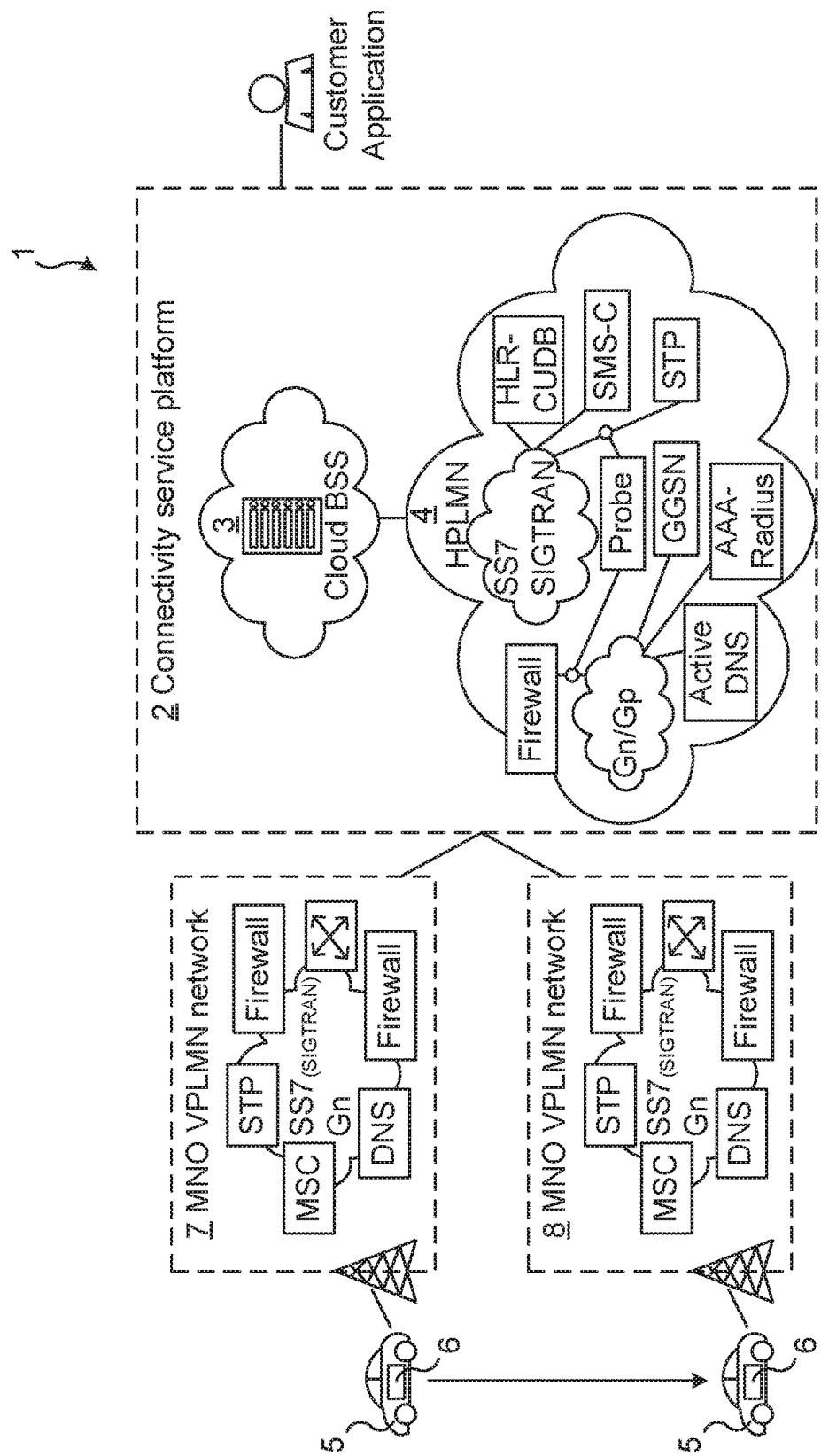
FIG. 1 is a schematic block diagram illustrating an embodiment of a communication network in accordance with the present disclosure.

FIG. 1 is a schematic block diagram illustrating an embodiment of a communication network 1 in accordance with the present disclosure. The communication network 1 comprises a connectivity service platform 2, e.g. an Ericsson Device Connection Platform (EDCP or DCP) for providing CN functionality for customers in the form of several different mobile network operators (MNO) for a plurality of radio devices 5 having eUICC 6, e.g. M2M devices 5. Each of the radio devices 5 may be any device or user equipment (UE), mobile or stationary, enabled to communicate over a radio channel in a communications network, for instance but not limited to e.g. mobile phone, smart phone, modem, sensors, meters, vehicles such as cars or the like, household appliances, medical appliances, media players, cameras, or any type of consumer electronic, for instance but not limited to television, radio, lighting arrangements, tablet computer, laptop, or personal computer (PC). The connectivity service platform 2 of the embodiment of FIG. 1 comprises a cloud business support system (BSS) 3 as well as a cloud home public land mobile network (HPLMN) 4. The HPLMN 4 comprises any regular CN nodes or modules of a radio communication network, e.g. home location register (HLR), Gateway General Packet Radio Service (GPRS) support node (GGSN), short message service centre (SMSC), Signal Transfer Point (STP), Domain Name System (DNS), and authentication, authorization and accounting (AAA) RADIUS, for e.g. Signalling System 7 (SS7) and/or Integrated Services Digital Network (ISDN) communications protocols of signalling transport (SIGTRAN). The radio device 5 has a wireless connection to the network 1 and the platform 2 via a wireless connection provided by a visited PLMN (VPLMN) of a network operator 7 or 8. Each of the VPLMN also comprise the nodes and modules typical for such networks. Each operator 7, 8 has a radio access network (RAN) with base stations via which radio devices may connect wirelessly provided that they have an enabled and active subscription with the operator. Since the radio device has an eUICC, the eUICC needs to be flash updated in order to change to a new subscription for its wireless connection. Instructions for the update need typically be received via its wireless connection of an old subscription before the change to the new subscription. The new subscription, may be with the same operator 7 as the old subscription, but it may more commonly be with a new operator 8.

The platform 2—eUICC 6 synchronized fall-back mechanism (measurement based) of the present disclosure makes sure that the fall-back mechanism is occurring on both the eUICC and on the platform simultaneously, so that after fall-back to e.g. the provisioning subscription, the connectivity can be active and recovered on both the eUICC and the platform 2. It is problematic if e.g. the eIUCC falls back to a second subscription (e.g. provisioning subscription) while the platform does not fall back, or does not fall back to the same subscription as the radio device. Then the second subscription will not be activated/enabled on the network side. This problem is solved by the synchronized fall-back of the present disclosure. The radio device 5 may e.g. experience a problem with a new subscription when performing a handover from an old subscription to a new one. If, after having enabled the new subscription (the first subscription), both the radio device and the platform may perform measurements on the new subscription and determine that there is a problem. As a result, they both fall back in accordance with their fall-back policy to the second subscription which may e.g. be the old subscription or the provisioning subscription. To change subscription e.g. during handover or fall-back, comprises to disable old subscription and enable new subscription, old international mobile subscriber (IMSI) detaches from the old network 7 and new IMSI attaches to new network 8:

1) eUICC Side During Handover

The eUICC 6 detects that the new enabled subscription/connectivity doesn't work, which prompts it to use the pre-defined fall-back triggering timer 32 and fall-back policy 37. Then the eUICC disables the current enabled subscription (the new, first subscription), and enables e.g. the provisioning subscription (the second subscription). The eUICC then tries again to connect to the network 1 using the provisioning subscription.

2) Simultaneously on the Network (Platform 2) Side

The platform detects the new enabled subscription/connectivity doesn't work, which prompts it to use the pre-defined fall-back triggering timer 22 and fall-back policy 27 (typically same/corresponding timer and policy as on the eUICC side). Then, the platform disables the current enabled subscription (first subscription), and enables the provisioning subscription (second subscription) in BSS 3/HLR 28. The platform will then wait for the eUICC to connect again via the provisioning subscription.

3) The eUICC 6 Tries to Connect Via the Provisioning Subscription

Success? Synchronized fall-back done.

Failure? Shall Retry. The platform 2 should keep the provisioning subscription enabled and keep waiting for the device 5/eUICC 6 to reconnect via the provisioning subscription. The radio device shall retry to attach to the network via the provisioning subscription if the 1st attachment attempt has failed, since is may be due to that the provisioning subscription hasn't yet been enabled on the network side as part of the fall-back of the platform 2, so the device 5 should wait a while and then attempt to attach again. The eUICC and platform should wait for each other to establish connection, until it is successfully established.

In some embodiments of the present disclosure, the determining comprises receiving or otherwise obtaining an error message comprising information about a failure in the wireless network connection from the first subscription of the radio device. The platform 2 may e.g. try to contact the radio device 5 via the first subscription connection, whereby the network 1 returns the error message to or in the platform. In some embodiments, the error message is triggered within the platform 2, e.g. by the HLR, the SMSC or GGSN, but in some other embodiments the error message is triggered outside the platform 2 e.g. by a serving GPRS support node (SGSN) or Mobile switching centre (MSC). The error message may e.g. imply that it is not possible to find a functioning network connection to the radio device. An error message may then be sent by the platform 2 to the radio device 5.

In some embodiments of the present disclosure, the radio device 5 has a wireless network connection from an enabled subscription. In that case, the platform 2 method may comprise attempting to perform a handover of the network connection of the radio device from the enabled subscription to the first subscription. The method may then comprise receiving a subscription management message instructing the connectivity service platform 2 to perform a handover from the enabled subscription to the first subscription for the wireless connection of the radio device 5, and sending a subscription management message to the radio device 5, instructing the radio device to perform the handover from the enabled subscription to the first subscription for the wireless connection of the radio device. The handover attempt is performed before the determining that the radio device 5 experiences a problem with the wireless network connection from the first subscription. As part of the fall-back, the platform 2 and device 5 may fall back to e.g. the previously enabled subscription as the second subscription or the provisioning subscription as the second subscription.

In some embodiments of the present disclosure, the radio device 5 has a wireless network connection from the first subscription, before the determining that the radio device experiences a problem with the wireless network connection from the first subscription. This implies that the problem is not experienced when trying to connect via the first subscription for the first time, but at a later stage when the network connection via the first subscription has been functional for a time.

In some embodiments of the present disclosure, the falling back of the platform 2 comprises sending instructions to a network operator that the second subscription should be activated. This may be necessary in order for the operator 7 or 8 to activate/enable the fall-back subscription such that the radio device 5 can fall back to that new subscription to obtain network connectivity.

In some embodiments of the present disclosure, the falling back comprises, for both the platform 2 and the radio device 5, to enable the second (new/fall-back) subscription for enabling communication the radio device 5 and the platform 2 over the wireless connection of the second subscription.

In some embodiments of the present disclosure, the second (fall-back) subscription is with a second network operator 8, different than the first network operator 7. However, in other embodiments, the second subscription may be with the same first network operator 7 as the first subscription.

In some embodiments of the present disclosure, the second (fall-back) subscription is a provisioning subscription of the radio device eUICC 6. The provisioning subscription may be suitable for fall-back since it is typically always present, even if not enabled, in the eUICC. This implies that also the platform 2 has to enable the provisioning subscription, and the operator 8 who provides the provisioning subscription has to activate it if it is not already active.

In some embodiments of the present disclosure, the fall-back timer is set to expire after between 10 and 60 minutes from having been started in accordance with the stored fall-back policy. The timer of either the platform 2 and/or the radio device 5 (typically the timer is set to run for the same time period both in the radio device and the platform in order to provide synchronised and simultaneous fall-back) could be set to any suitable period, but it may be suitable to not use a period of less than 10, 15 or 20 minutes in order to provide ample time for the radio device to exhaust the possibilities of connecting via the first subscription. A period above 0.5, 1 or 2 hours may allow the radio device to be without a functioning network connection for too long, depending on the circumstances.

Figure 2:
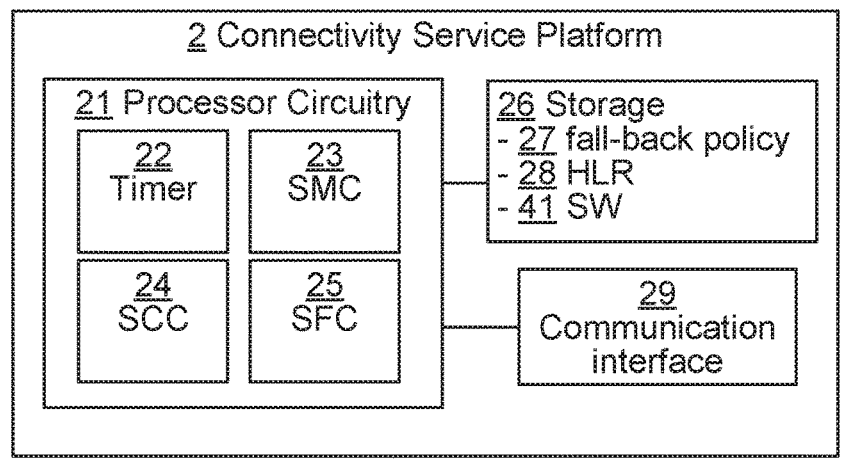
FIG. 2 is a schematic block diagram of an embodiment of a connectivity service platform of the present disclosure.
Figure 7:
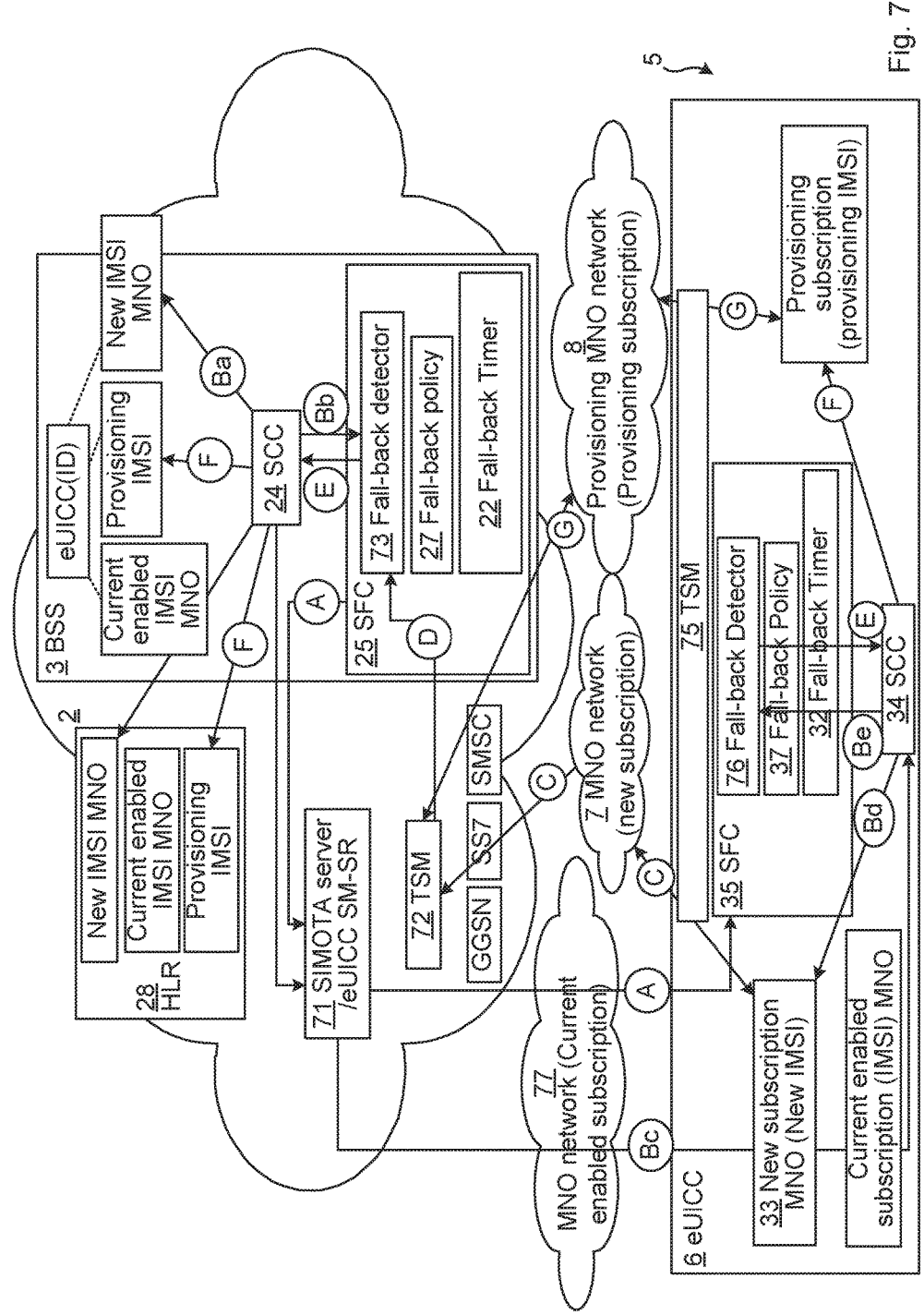
FIG. 7 is a schematic block diagram illustrating example embodiments of the present disclosure.

FIG. 2 is a schematic block diagram of an embodiment of a connectivity service platform 2 of the present disclosure. The platform 2 comprises processor circuitry 21 e.g. a central processing unit (CPU). The processor circuitry 21 may comprise one or a plurality of processing units in the form of microprocessor(s). However, other suitable devices with computing capabilities could be comprised in the processor 21, e.g. an application specific integrated circuit (ASIC), a field programmable gate array (FPGA) or a complex programmable logic device (CPLD). The processor circuitry 21 is configured to run one or several computer program(s) or software 41 stored in a storage 26 e.g. comprising a memory. The processor circuitry comprises one or several modules 22-25 as a result of executing SW 41 in the storage 26, e.g. the fall-back triggering timer 22, a subscription management component (SMC) 23, a subscription change component (SCC) 24 and/or a subscription fall-back component (SFC) 25 which is below, in FIG. 7, as an example depicted as comprising the timer 22 as well as the executed fall-back policy 27 and the fall-back detector 73. The platform 2 also comprises a functionality for performing measurements on the network connection of the radio device 5, e.g. in the form of another module which in the example of FIG. 7 is called a traffic and signalling monitor (TSM) 72. Each of these modules may be formed by separate or dedicated processors of the processor circuitry 21 or by a common processor. The storage 26 may comprise one or several storage units, of one or several type(s), each of which can be regarded as a computer readable means as discussed herein and may e.g. be in the form of a Random Access Memory (RAM), a Flash memory or other solid state memory, or a hard disk, or be a combination thereof. Also the HLR 28 as well as the fall-back policy 27 is part of/stored in the storage 26. The processor circuitry 21 is also configured to store data in the storage 26, as needed. The platform 2 also comprises a communication interface 29 for communication with the radio device 5 as well as with other parts of the communication network 1 such as the operators 7 and 8. The communication interface may comprise a transmitter and a receiver for, in cooperation with the processor circuitry 21, sending and receiving data messages and other digital signalling.

Figure 3:
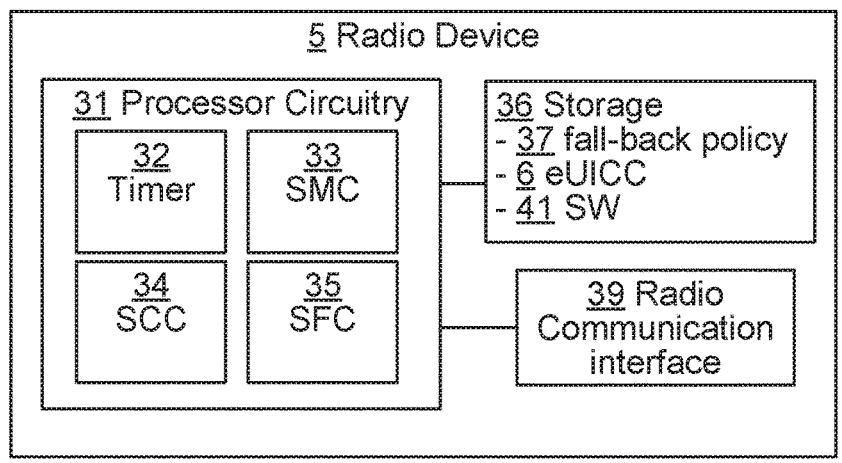
FIG. 3 is a schematic block diagram of an embodiment of a radio device of the present disclosure.

FIG. 3 is a schematic block diagram of an embodiment of a radio device 5 of the present disclosure. The radio device 5 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software 41 stored in a storage 36 e.g. comprising a memory. The processor circuitry comprises one or several modules 32-35 as a result of executing SW 41 in the storage 36, e.g. the fall-back triggering timer 32, a subscription management component (SMC) 33, a subscription change component (SCC) 34 and/or a subscription fall-back component (SFC) 35 which is below, in FIG. 7, as an example depicted as comprising the timer 32 as well as the executed fall-back policy 37 and a fall-back detector 76. The radio device 5 also comprises a functionality for performing measurements on the network connection of the radio device 5, e.g. in the form of another module which in the example of FIG. 7 is called a traffic and signalling monitor (TSM) 75. Each of these modules may be formed by separate or dedicated processors of the processor circuitry 31 or by a common processor. The storage 36 may comprise one or several storage units, of one or several type(s), each of which can be regarded as a computer readable means as discussed herein and may e.g. be in the form of a Random Access Memory (RAM), a Flash memory or other solid state memory, or a hard disk, or be a combination thereof. Also the eIUCC 6 of the device 5 as well as the fall-back policy 37 is part of/stored in the storage 36. The processor circuitry 31 is also configured to store data in the storage 36, as needed. The radio device 5 also comprises a radio communication interface 39 for communication with the platform 2 as well as with other parts of the communication network 1 such as the operators 7 and 8. The communication interface may comprise a transmitter and a receiver, as well as an antenna, for, in cooperation with the processor circuitry 31, sending and receiving data messages and other digital signalling wirelessly.

Figure 4:
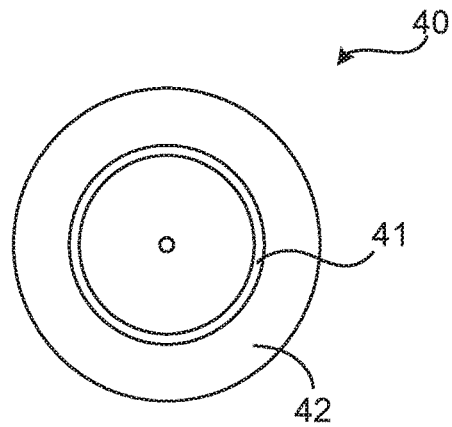
FIG. 4 is a schematic illustration of an embodiment of a computer program product of the present disclosure.

FIG. 4 illustrates a computer program product 40. The computer program product 40 comprises a computer readable medium 42 comprising a computer program 41 in the form of computer-executable components 41. The computer program/computer-executable components 41 may be configured to cause a device, e.g. the platform 2 or the radio device 5 as discussed herein, to perform an embodiment of the method of the present disclosure. The computer program/computer-executable components may be run on the processor circuitry 21 of the platform 2 or the processor circuitry 31 of the radio device 5 for causing the device to perform the method. The computer program product 40 may e.g. be comprised in a storage 26 or 36 comprised in the platform or radio device and associated with the processor circuitry 21 or 31. Alternatively, the computer program product 40 may be, or be part of, a separate, e.g. mobile, storage means, such as a computer readable disc, e.g. CD or DVD or hard disc/drive, or a solid state storage medium, e.g. a RAM or Flash memory.

FIG. 5a is a schematic flow chart of an embodiment of a method of the connectivity service platform 2, of the present disclosure. The platform 2 stores 50 its fall-back policy 27 comprising information about its fall-back timer 22 in its storage 26. The platform 2 sends 51 a policy message comprising information about the fall-back policy 27 to the radio device 5 comprising an eUICC 6, said radio device having a wireless network connection (via the first subscription or via another earlier subscription). The policy message should be sent 51 before the later step of falling back 54. The platform 2 determining 52 that the radio device 5 experiences a problem with a wireless network connection from a first subscription of the radio device with a first network operator 7. In response to the determining that there is a problem, the platform 2 starts 53 its fall-back timer 22 in accordance with its fall-back policy 27. Then, if and when the fall-back timer 22 has expired after having run its full duration, the platform 2 falls back 54 in accordance with the stored 50 fall-back policy 27 in response to the started 53 fall-back timer 22 having expired, thereby enabling the connectivity service platform 2 to communicate with the radio device 5 via a network connection from a second subscription of the radio device instead of from the first subscription.

FIG. 5b is a schematic flow chart of another embodiment of a method of the connectivity service platform 2, of the present disclosure. The steps of storing 50, sending 51 a policy message, determining 52, starting 53 the timer 22, and falling back 54 are as discussed in relation to FIG. 5a. Further, the platform 2 may in some embodiments receive 55 a subscription management message instructing the connectivity service platform 2 to perform a handover from an enabled subscription to the first subscription for the wireless connection of the radio device 5. Then, in some embodiments, the platform 2 may, send 56 a subscription management message to the radio device 5, instructing the radio device to perform the handover from the enabled subscription to the first subscription for the wireless connection of the radio device 5. This subscription management signalling is performed before the determining 52 that there is a problem with the first subscription. In some embodiments, the determining 52 that there is a problem with the first subscription comprises obtaining 57 (e.g. receiving or creating) an error message comprising information about a failure in the wireless network connection from the first subscription of the radio device 5. In some embodiments, the falling back 54 comprises sending 58 instructions to a network operator 8 providing the second subscription that the second subscription should be activated by the operator 8. In some embodiments, the falling back 54 comprises enabling 59 the second subscription in the connectivity service platform 2 for communication with the radio device 5.

FIG. 6a is a schematic flow chart of an embodiment of a method of the radio device 5, of the present disclosure. The radio device 5 receives 60 a policy message, comprising information about a platform fall-back policy 27 including a platform fall-back timer 22, from the connectivity service platform 2 via a wireless network connection (via the first subscription or via another earlier subscription). The policy message is received 60 before the later step of falling back 64. The radio device stores 61 a device fall-back policy 37 comprising information about a device fall-back timer 32 based on said received 60 policy message. The device fall-back policy 37 is typically the same or substantially corresponding to the fall-back policy 27 of the platform 2. The radio device 5 determines 62 that the radio device 5 experiences a problem with a wireless network connection from a first subscription of the radio device with a first network operator 7. In response to the determining 62 that there is a problem, the radio device 5 starts 63 its fall-back timer 32 in accordance with its fall-back policy 37. Then, if and when the fall-back timer 22 has expired after having run its full duration, the radio device 5 falls back 64 in accordance with the stored 60 fall-back policy 37 in response to the started 63 fall-back timer 22 having expired, thereby enabling the radio device 5 to communicate with the platform 2 via a network connection from a second subscription of the radio device instead of from the first subscription.

FIG. 6b is a schematic flow chart of another embodiment of a method of the radio device 5, of the present disclosure. The steps of receiving 60 a policy message, storing 61, determining 62, starting 63 the timer, and falling back 64 are as discussed in relation to FIG. 6a. Further, the radio device 5 may in some embodiments receive 65 a subscription management message instructing the radio device 5 to perform a handover from an enabled subscription to the first subscription for the wireless connection of the radio device 5. Further, the determining 62 may comprise receiving 66 an error message, e.g. from the platform 2, comprising information about a failure in the wireless network connection from the first subscription of the radio device 5. In some embodiments, the falling back 64 comprises enabling 67 the second subscription in the radio device 5 for obtaining the wireless network connection from the second subscription.

Example—Fall-Back Policy, on Both Platform 2 (Network) and eUICC 6 Side

Fall-back triggering timers 22 and 32 are set to e.g. 15 minutes.

Any time after subscription is changed as part of a handover from an enabled subscription to the first subscription, if both the platform 2 and eUICC 6 have kept on receiving certain failures or rejection (error) messages from the network with the new (first) subscription (i.e. MNO 7 IMSI) for 15 minutes (timer 22/32 threshold), then fall-back shall be executed on both eUICC and platform sides simultaneously. The fall-back (second) subscription could be e.g. the provisioning subscription.

Error messages include but are not restricted to the following (on both platform and radio device sides):

Attach Failures/Rejections

Location update failures (with MNO 7 IMSI) responded from the network 1.

Authentication failures (with MNO 7 IMSI) responded from the network 1.

Mobile Originated Short Message Service (MO-SMS) Failures/Rejections

MO SMS (with MNO 7 Mobile Subscriber Integrated Services Digital Network (ISDN) Number (MSISDN)) failures responded from the network. (e.g. the eUICC 6/device 5 will send out an MO-SMS confirmation immediately after it is attached to MNO 7 network using the new MNO 7 IMSI/MSISDN when changed subscription to the MNO 7 subscription)

Packet Data Protocol (PDP) Context Activation Failures/Rejections

Network failures (with MNO 7 IMSI) responded from the network 1

PDP Context Activation Failures (with MNO 7 IMSI) responded from the network 1

Below is a step-wise example of an embodiment of the method of the present disclosure in which a handover situation from an enabled (old) subscription with an old MNO 77 to the first (new) subscription with a new MNO 7 results in a fall-back to the second (fall-back) subscription, in this example the provisioning subscription) with the second MNO 8.

Reference is made to FIG. 7.

Step A

The subscription fall-back component (SFC) 25 in the platform 2 BSS 3 defines the platform fall-back triggering timer 22 and the platform fall-back policy 27, and sends 51 the value of the timer 22 and the fall-back policy 27 to the subscription fall-back component (SFC) 35 in the eUICC 6 of the radio device 5, by SIM provisioning by over-the-air (SIMOTA), eUICC subscription manager-secure routing (SM-SR), server 71 via the current enabled connectivity (MNO 77, international mobile subscriber identity (IMSI) connectivity).

Step B

Ba) The subscription change component (SCC) 24 in the platform 2 BSS 3 changes subscription from the current enabled subscription of MNO 77 to the new subscription (IMSI) of MNO 7, both in the platform BSS 3 and HLR 28.

Bb) The SCC 24 in platform BSS 3 notifies the subscription fall-back component (SFC) 25 in BSS 3, whereby the fall-back detector 73 in the SFC 25 starts running Bc) The SCC 24 in BSS 3 also notifies the eUICC 6 SCC 34 via SIMOTA (eUICC SM-SR) server 71 to change the subscription from current enabled subscription of MNO 77 to the new subscription (IMSI) of MNO 7, via the current enabled subscription MNO 77 connectivity.

Bd) The SCC 34 in eUICC 6 changes subscription from the current enabled subscription of MNO 77 to the new subscription (IMSI) of MNO 7.

Be) The SCC 34 in eUICC 6 notifies the SFC 35 in the eUICC 6, whereby the fall-back detector 76 in the SFC 35 starts running.

Step C

The radio device 5 detaches from the current MNO 77 network and starts to attach to the MNO 7 network using the new MNO IMSI. The traffic and signalling monitor (TSM) 75 in the eUICC 6 (or elsewhere in device 5) starts to monitor the ongoing signalling flow and traffic flow with MNO 7 IMSI, on the device 5 side.

Meanwhile the TSM 72 in the platform 2 starts to monitor the ongoing signalling flow and traffic flow with the MNO 7 network, including all signalling and traffic using the new MNO 7 IMSI.

Step D

On both the eUICC 6 and platform 2 (network) side:

The fall-back detector 73/76 acquires the real-time traffic and signalling log from the TSM 72/75, in order to detect whether 52/62 the new enabled MNO 7 subscription (MNO 7 IMSI) works well or not.

When the fall-back detector 73/76 receives 57/66 the first time failure or rejection message regarding MNO 7 IMSI from the TSM real-time log, the fall-back detector will start 53/63 the timer 22/32.

When the fall-back timer 22/32 expires and the fall-back detector 73/76 still keeps detecting the failure or rejection messages regarding MNO 7 IMSI, it shall make decision to fall-back 54/64 to provisioning subscription of fall-back MNO 8, according to the pre-defined fall-back policy 27/37. It should be kept in mind that the fall-back policies as well as the timers are typically the same, or substantially corresponding to each other, in the platform 2 and the radio device 5.

Step E

On both the eUICC 6 and platform 2 (network) side:

If the decision based on the fall-back policy 27/37 is that it the platform 2/device 5 should fall back to the provisioning subscription, the fall-back detector 73/76 will notify the SCC 24/34 to change the subscription to the provisioning subscription.

Step F

The eUICC 6 disables the MNO 7 subscription, and enables the MNO 8 provisioning subscription.

The platform 2 disables the MNO 7 subscription, and enables the MNO 8 provisioning subscription in BSS 3 and HLR 28.

Step G

The eUICC 6 tries to connect to network via the provisioning subscription connectivity, while the platform 2 waits for the eUICC to be connected to the network 1 again.

Success? Synchronized fall-back done.

Failure? Shall Retry. The platform 2 should keep the provisioning subscription enabled and keep waiting for the device 5/eUICC 6 to reconnect via the provisioning subscription. The radio device shall retry to attach to the network via the provisioning subscription if the 1st attachment attempt has failed, since is may be due to that the provisioning subscription hasn't yet been enabled on the network side as part of the fall-back of the platform 2, so the device 5 should wait a while and then attempt to attach again. The eUICC and platform should wait for each other to establish connection, until it is successfully established.

Note: If there are other available subscriptions (operational subscription) than the provisioning subscription existing on both eUICC 6 and platform 2, it is also possible to fall back 55/64 to that subscription, why the present disclosure is not restricted to fall-back to the provisioning subscription only. If the fall-back to the second subscription fails, it is possible to, in accordance with the fall-back policy 27/37, fall back to yet another subscription. The fall-back mechanisms for any second, third etc. fall-back of both the platform 2 and the radio device 5 may be as described above for the (first) fall-back mechanism.

Below follow some other aspects of the present disclosure.

According to an aspect of the present disclosure, there is provided a connectivity service platform 2 for a communication network 1. The connectivity service platform 2 comprises means (e.g. the storage 26) for storing 50 a fall-back policy 27 comprising information about a fall-back timer 22. The connectivity service platform 2 also comprises means (e.g. the processor circuitry 21, such as the SFC 25, in cooperation with the communication interface 29) for sending 51 a policy message comprising information about the fall-back policy 27 to a radio device 5 comprising an eUICC 6, said radio device having a wireless network connection. The connectivity service platform 2 also comprises means (e.g. the processor circuitry 21, such as the TSM 72 and/or the fall-back detector 73) for determining 52 that the radio device 5 experiences a problem with a wireless network connection from a first subscription of the radio device with a first network operator 7. The connectivity service platform 2 also comprises means (e.g. the processor circuitry 21, such as the SFC 25) for starting 53 the fall-back timer 22 in accordance with the stored 50 fall-back policy 27 in response to said determining 52. The connectivity service platform 2 also comprises means (e.g. the processor circuitry 21, such as the SCC 24) for falling back (54) in accordance with the stored (50) fall-back policy (27) in response to the started (53) fall-back timer (22) having expired, thereby enabling the connectivity service platform (2) to communicate with the radio device (5) via a network connection from a second subscription of the radio device instead of from the first subscription.

According to another aspect of the present disclosure, there is provided a radio device 5 for a communication network 1. The radio device comprises an eUICC 6. The radio device 5 also comprises means (e.g. the processor circuitry 31, such as the SFC 35, in cooperation with the radio communication interface 39) for receiving 60 a policy message, comprising information about a platform fall-back policy 27 including a platform fall-back timer 22, from a connectivity service platform 2 via a wireless network connection. The radio device 5 also comprises means (e.g. the storage 36) for storing 61 a device fall-back policy 37 comprising information about a device fall-back timer 32 based on said received 60 policy message. The radio device 5 also comprises means (e.g. the processor circuitry 31, such as the TSM 75 and/or the fall-back detector 76) for determining 62 that the radio device 5 experiences a problem with a wireless network connection from a first subscription of the radio device with a first network operator 7. The radio device 5 also comprises means (e.g. the processor circuitry 31, such as the SFC 35) for starting 63 the device fall-back timer 32 in accordance with the stored 61 fall-back policy 37 in response to said determining 62. The radio device 5 also comprises means (e.g. the processor circuitry 31, such as the SCC 34) for falling back 64 in accordance with the stored 61 fall-back policy 37 in response to the started 63 fall-back timer 32 having expired, thereby enabling the radio device 5 to communicate with the connectivity service platform 2 via a network connection from a second subscription of the radio device instead of from the first subscription.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a card embedded in a radio device in a communication network, the method comprising:
   receiving a policy message, comprising information about a fall-back policy including a fall-back timer;

storing a device fall-back policy comprising information about a device fall-back timer based on the received policy message;

determining that the radio device experiences a problem with a wireless network connection from a first subscription of the radio device with a first network operator;

starting the device fall-back timer in accordance with the stored fall-back policy in response to said determining; and falling back in accordance with the stored fall-back policy in response to the started fall-back timer having expired, thereby allowing the radio device to have a wireless network connection from a second subscription of the radio device instead of from the first subscription.

2. The method of claim 1, wherein the card is an embedded Universal Integrated Circuit Card (eUICC) and the fall-back policy is from a connectivity service platform node in the communication network that manages subscriptions for radio devices having an embedded eUICC.

3. The method of claim 2, wherein the wireless network connection from a first subscription and the wireless network connection from a second subscription comprises a connection to the connectivity service platform.

4. The method of claim 1, wherein the determining comprises receiving an error message comprising information about a failure in the wireless network connection from the first subscription of the radio device.

5. The method of claim 1, wherein the determining comprises acquiring information from the communication network indicating how well the wireless connection is working.

6. The method of claim 1, wherein the radio device has a wireless network connection from an enabled subscription, and wherein the determining that the radio device experiences a problem with the wireless network connection from the first subscription comprises determining before the radio device receives a subscription management message instructing the radio device to perform a handover from the enabled subscription to the first subscription for the wireless connection of the radio device.

7. The method of claim 1, wherein the radio device has a wireless network connection from the first subscription, before the determining that the radio device experiences a problem with the wireless network connection from the first subscription.

8. The method of claim 1, wherein the falling back comprises enabling the second subscription in the radio device for obtaining the wireless network connection from the second subscription.

9. The method of claim 1, wherein the second subscription is with a second network operator, different than the first network operator.

10. A card configured to be embedded in a radio device, the card comprises memory and circuitry, the circuitry configured to:

receive a policy message, comprising information about a fall-back policy including a fall-back timer;

store a device fall-back policy comprising information about a device fall-back timer based on the received policy message;

determine that the radio device experiences a problem with a wireless network connection from a first subscription of the radio device with a first network operator;

start the device fall-back timer in accordance with the stored fall-back policy in response to said determining; and fall back in accordance with the stored fall-back policy in response to the started fall-back timer having expired, thereby allowing the radio device to have a wireless network connection from a second subscription of the radio device instead of from the first subscription.

11. The card of claim 10, wherein the card is an embedded Universal Integrated Circuit Card (eUICC) and the fall-back policy is from a connectivity service platform node in the communication network that manages subscriptions for radio devices having an embedded eUICC.

12. The method of claim 11, wherein the second subscription is a provisioning subscription of the card.

13. The card of claim 11, wherein the wireless network connection from a first subscription and the wireless network connection from a second subscription comprises a connection to the connectivity service platform.

14. The card of claim 10, wherein the circuitry is configured to determine that the radio device experiences a problem by receiving an error message comprising information about a failure in the wireless network connection from the first subscription of the radio device.

15. The card of claim 10, wherein the radio device has a wireless network connection from an enabled subscription, and wherein the determining that the radio device experiences a problem with the wireless network connection from the first subscription comprises determining before the radio device receives a subscription management message instructing the radio device to perform a handover from the enabled subscription to the first subscription for the wireless connection of the radio device.

16. The card of claim 10, wherein the radio device has a wireless network connection from the first subscription, before the determining that the radio device experiences a problem with the wireless network connection from the first subscription.

17. The card of claim 10, wherein the circuitry is configured to fall back by enabling the second subscription in the radio device for obtaining the wireless network connection from the second subscription.

18. The card of claim 10, wherein the second subscription is with a second network operator, different than the first network operator.

19. The card of claim 10, wherein the second subscription is a provisioning subscription of the card.

20. A non-transitory computer readable medium storing computer program code that, when run on circuitry of a card embedded in a radio device, causes the card to:

receive a policy message, comprising information about a fall-back policy including a fall-back timer;

store a device fall-back policy comprising information about a device fall-back timer based on the received policy message;

determine that the radio device experiences a problem with a wireless network connection from a first subscription of the radio device with a first network operator;

start the device fall-back timer in accordance with the stored fall-back policy in response to said determining; and fall back in accordance with the stored fall-back policy in response to the started fall-back timer having expired, thereby allowing the radio device to have a wireless network connection from a second subscription of the radio device instead of from the first subscription.

\* \* \* \* \*